United States Patent
Ståhle

(10) Patent No.: US 6,414,984 B1
(45) Date of Patent: *Jul. 2, 2002

(54) METHOD FOR CONTROLLING A RECEIVER, AND A RECEIVER

(75) Inventor: Lauri Ståhle, Oulu (FI)

(73) Assignee: Nokia Telecommunications Oy, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/077,056

(22) PCT Filed: Nov. 19, 1996

(86) PCT No.: PCT/FI96/00628
§ 371 (c)(1),
(2), (4) Date: May 18, 1998

(87) PCT Pub. No.: WO97/19522
PCT Pub. Date: May 29, 1997

(30) Foreign Application Priority Data

Nov. 20, 1995 (FI) .................................................. 955585

(51) Int. Cl.[7] .............................................. H04L 27/30
(52) U.S. Cl. ........................ 375/142; 375/150; 370/320
(58) Field of Search ................................ 375/144, 148, 375/145, 142, 150, 347, 267; 370/320, 335, 342, 441

(56) References Cited

U.S. PATENT DOCUMENTS

| | | | |
|---|---|---|---|
| 5,305,349 A | | 4/1994 | Dent |
| 5,448,600 A | * | 9/1995 | Lucas .......................... 375/205 |
| 5,652,765 A | * | 7/1997 | Adachi et al. ............... 375/211 |
| 5,654,980 A | * | 8/1997 | Latva-aho et al. ........... 375/208 |
| 5,768,306 A | * | 6/1998 | Sawahashi et al. .......... 375/206 |
| 5,799,004 A | * | 8/1998 | Keskitalo et al. ............ 370/335 |
| 5,832,023 A | * | 11/1998 | Latva-aho .................... 375/200 |
| 5,910,948 A | * | 6/1999 | Shou et al. .................. 370/335 |
| 5,936,999 A | * | 8/1999 | Keskitalo ..................... 375/200 |
| 5,966,411 A | * | 10/1999 | Struhsaker ................... 375/332 |
| 6,044,104 A | * | 3/2000 | Watanabe .................... 375/200 |

FOREIGN PATENT DOCUMENTS

| | | |
|---|---|---|
| EP | 0 668 662 | 8/1995 |
| EP | 0 661 830 | 9/1995 |
| EP | 0 675 606 | 10/1995 |
| EP | 0 690 588 | 1/1996 |
| EP | 0 691 754 | 1/1996 |
| EP | 0 718 998 | 6/1996 |
| GB | 2278983 | 12/1994 |
| WO | WO 96/37054 | 11/1996 |

OTHER PUBLICATIONS

Copy of the International Search Report for PCT/FI96/00628.

* cited by examiner

Primary Examiner—Stephen Chin
Assistant Examiner—Dac V. Ha
(74) Attorney, Agent, or Firm—Altera Law Group, LLC

(57) ABSTRACT

The invention relates to a method for controlling a receiver and to a receiver realized with the rake principle and comprising a number of correlator branches (200–204) that can be synchronized with the received signal. In order to enable the rapid operation of the receiver, the correlator branches (200–204) of the receiver according to the invention comprise means (304) for searching for advantageous signal components and means (116, 310) for guiding a branch to receive an advantageous signal component it has found.

15 Claims, 1 Drawing Sheet

METHOD FOR CONTROLLING A RECEIVER, AND A RECEIVER

FIELD OF THE INVENTION

The invention relates to a method for controlling a receiver realized with the rake principle and comprising a number of correlator branches that can be synchronized with a received signal.

BACKGROUND OF THE INVENTION

A receiver operating with the rake principle comprises several branches each of which may be synchronized with a different signal component. Therefore the receiver can receive several signals simultaneously. Rake receivers are used especially in CDMA receivers.

CDMA is a multiple access method, which is based on the spread spectrum technique and which has been applied recently in cellular radio systems, in addition to the prior FDMA and TDMA methods. CDMA has several advantages over the prior methods, for example the simplicity of frequency planning and spectral efficiency.

In the CDMA method, the narrow-band data signal of the user is multiplied to a relatively wide band by a spreading code having a considerably broader band than the data signal. In known test systems, bandwidths such as 1.25 MHz, 10 MHz and 25 MHz have been used. In connection with multiplying, the data signal spreads to the entire band to be used. All users transmit by using the same frequency band simultaneously. A separate spreading code is used over each connection between a base station and a mobile station, and the signals of the users can be distinguished from one another in the receivers on the basis of the spreading code of each user. The spreading codes are preferably selected in such a way that they are mutually orthogonal, i.e. they do not correlate with each other.

Correlators provided in conventional CDMA receivers are synchronized with a desired signal, which is recognized on the basis of a spreading code. The data signal is restored in the receiver to the original band by multiplying it again by the same spreading code as during the transmission. Signals multiplied by some other spreading code do not correlate in an ideal case and are not restored to the narrow band. They appear thus as noise with respect to the desired signal. The object is to detect the signal of the desired user from among several interfering signals. In practice, the spreading codes are not orthogonal and the signals of other users hinder the detection of the desired signal by distorting the received signal non-linearly. This interference caused mutually by the users is called multiple access interference.

For the performance of the spread spectrum system, it is of primary importance that the receiver can be synchronized with the incoming signal rapidly and accurately. The synchronization with the incoming signal usually takes place in two stages. In the acquisition of the code phase, the desired signal is to be located from the received transmission and the phase of the signal is to be determined with the accuracy of half a chip. When this has been completed, the phase is considered locked, whereafter the code phase is fine-tuned with a code tracking loop that is in charge of maintaining the phase locking.

The acquisition of the code phase can be implemented by means of either a matched filter or active correlation. The former method is fast but it is only applicable for short codes and it consumes a great deal of current when implemented digitally. Active correlation is the most often used method in CDMA systems. In active correlation, code phases of a local correlator are scanned in steps of half a chip and each phase is compared to the received signal. This implementation is economically advantageous but slow. The acquisition can be hastened by using several correlators in parallel so that the area of acquisition can be divided into several parts. The time of acquisition is then naturally shorter.

In prior arrangements the rake receivers have been designed in such a way that the acquisition of the new code phases takes place in a centralized manner in a separate searcher branch. The searcher branch searches for signals intended for the receiver and separate correlators are reserved for monitoring and demodulating the signals that have been found. Another known arrangement is to use all correlators for the acquisition when connecting to the system, and when the desired signal has been found, the operation of the correlators is invariable, i.e. one or two branches operate as searchers and the others monitor the desired signal.

The control algorithm for the branches of the rake receiver is a complicated sorting algorithm that is complex to implement as regards both software and hardware. Due to the complicated nature, calculating the control algorithm of the branches also takes up a great deal of time, which deteriorates the performance of the receiver.

CHARACTERISTICS OF THE INVENTION

The purpose of the present invention is to realize a receiver where the rake branches are controlled in a simple manner and the control is faster than in the conventional arrangements.

This is achieved with a method of the type described in the preamble, characterized in that each correlator branch in the receiver searches for advantageous signal components, synchronizes itself with a signal component it has found, and that each branch monitors and receives the signal component it has found.

The invention also relates to a receiver realized with the rake principle and comprising a number of correlator branches that can be synchronized with the received signal. The receiver according to the invention is characterized in that the correlator branches of the receiver comprise means for searching for advantageous signal components and means for guiding a branch to receive an advantageous signal component it has found.

In the method according to the invention, each branch in a rake receiver searches for a signal that it starts to receive and monitor. The branches of the rake receiver start operating with different delays in order to ensure the starting of fast reception. When the branches scan the different signal delays, the levels of the signals that have been found are compared either to a predetermined or an adaptive threshold value. This ensures that only a signal that is of sufficiently high quality is selected for reception. The arrangement according to the invention does not require a separate searcher block or a block calculating the allocation of the branches. The calculation of the allocation is especially complicated, since it requires a considerable amount of software and hardware, and takes a relatively long amount of time.

DESCRIPTION OF THE DRAWINGS

In the following, the invention will be described in greater detail with reference to the examples according to the accompanying drawings, in which.

DESCRIPTION OF THE PREFERRED EMBODIMENTS

Examine at first a typical CDMA signal. Assume in the following example that the system uses BPSK modulation, without restricting the invention thereto, however. The signal to be transmitted is multiplied both with a spreading code and a carrier wave $\cos(w_0 t)$. Assume that the duration of a bit (chip) in the spreading code is $T_c$. When the signal is then multiplied with a spreading code $c(t)$ having a frequency that is considerably greater than the frequency of the information signal, the spectrum of the signal to be transmitted spreads to a band $1/T_c$. The signal on the channel is delayed, wherefore the received signal can be set forth in the following form $a(k)*c(t-\tau)\cos(\omega_0 t)$, wherein $a(k)$=binary data ($\pm 1$)

$c(t)$=time-continuous spreading code $\omega_0$=carrier wave angular frequency $\tau$=transit time delay.

In the receiver, the received signal must be composed back to a narrow band. To enable this, the receiver must have the same spreading code as the transmitter and the code should also have the same phase. The function in the reception is to estimate the transit time delay $\tau$. The information signal is obtained by multiplying the received signal with a spreading code having the correct phase according to the following formula $a(k)*c(t-\tau T)c(t-\tau')\cos((\omega_0 t)$, wherein $\tau'$ is the estimate for the transit time delay.

If the spreading code generated by the receiver has exactly the correct phase, the signal that can be composed is $a(k)\cos(\omega_0 t)$ which equals the original carrier and data-modulated signal. If the phase of the spreading code generated in the receiver deviates for example 0.5 chip, in the case of BPSK the performance of the receiver deteriorates 6 dB. Rapid and exact phase acquisition is therefore essential.

Figure 1:
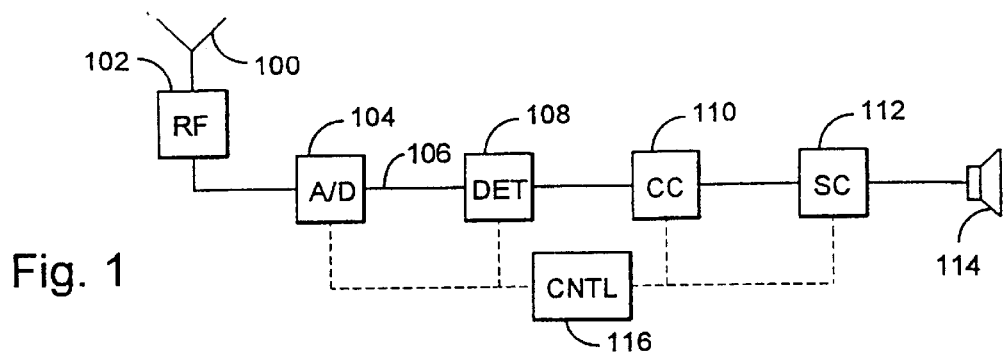
FIG. 1 is a general block diagram illustrating a receiver according to the invention in a spread spectrum/system.

Examine next the general structure of a receiver according to the invention by means of the block diagram of FIG. 1. The figure shows a receiver of a subscriber equipment, but the receiver according to the invention may naturally also be located in a base station and the essential parts of the receiver, i.e. especially the detection blocks, are implemented in the same manner as in the terminal equipment. The receiver according to the invention comprises an antenna 100 receiving a signal that is applied to radio-frequency parts 102 wherein the signal is converted into an intermediate frequency. From the radio-frequency parts the signal is applied to an analog-to-digital converter 104 wherein the signal is sampled and converted into a digital form. The converted signal 106 is applied to a detection block 108 where the channel parameters of the signal and the desired symbols contained in the signal are detected.

In the terminal equipment receiver shown in FIG. 1, the detected signal is applied to a channel decoder 110 and a speech decoder 112, whereafter the decoded speech signal is applied to a loudspeaker 114. If the equipment is a data terminal equipment, the speech decoder is naturally replaced with some other decoder. Further, if the receiver is a base station receiver, the signal is applied after the channel coding block to other parts of the receiver. The receiver according to the invention further comprises a control processor 116 that controls the operation of the other parts. The receiver according to the invention naturally also comprises other components, such as filters and amplifiers, as it is clear for a person skilled in the art, but they are not shown in the figure for the sake of clarity.

Figure 2:
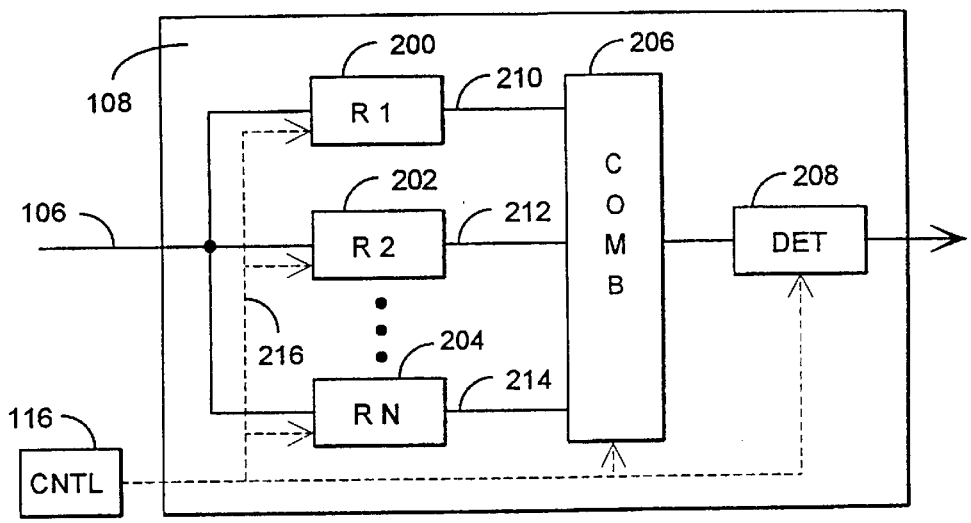
FIG. 2 illustrates in greater detail the structure of a detector in a receiver according to the invention.

Examine in greater detail the structure of the detector 108 in a receiver implemented with the rake principle by means of the block diagram of FIG. 2. The detector 108 comprises a number of rake branches 200 to 204 the input of which is the received signal 106 and each of which monitors and demodulates a separate multipath-propagated signal component. The outputs 210 to 214 of the branches 200 to 204 are applied to a diversity combiner 206 wherein the demodulated components can be preferably combined and diversity gain is thus obtained.

In the arrangement according to the invention, each branch independently searches for signal components with which it could be synchronized, and after finding a signal component fulfilling the criteria, it starts monitoring and receiving the component. The criteria for the reception may be the power level of the signal that is compared to a predetermined reference value, which may be a fixed or dynamically changing reference level. When a signal exceeding the reference level has been found, the branch makes sure that no other receiver branch already receives the detected component using signal detector 208. If the phase is already being received, the branch continues the acquisition of the signal from the following code phases.

The branches of the rake receiver receive and monitor signal components that are within a given so-called time window, i.e. that have delays within a certain interval. The time window to be received is set to a predetermined length. Adaptivity is also possible in adjusting the time window. The place of the time window is set for the first time when the first rake branch finds a signal that can be received. This may take place for example in such a way that the branch sets the initial and final phase of the time window in registers that are visible to all branches and that may be located for example in the control unit 116. The place of the time window is adjusted later in such a way that when the next rake branch finds itself a signal, it checks the availability of the component found, i.e. it examines whether the signal is received by any other branch, and when the delay is available, it updates the initial and final phase of the time window in the registers, for example by centring the time window on the code phases found.

The branches of the rake receiver receive the signal component they have found as long as possible. The branch must stop receiving the signal either when it deteriorates below the reference value or if the component is left outside the time window to be received due to changes in the components of the other branches. The branch that has lost its signal then searches for a new signal component from the time window that is received until it finds a component that fulfils the criteria.

After having found a signal component, each rake branch therefore always checks that the component is not used by some other branch. Each branch is supplied with its own clock signal 216 that is synchronized in such a way that each branch has its own time slot for reading and updating the required registers. The clock signal controls the checking of the phases of the other branches and the reading and updating of the time window registers. Due to synchronization, each branch reads the registers at a different time, and therefore the registers are updated in a controlled manner and the branches do not update the time window independently of or unknown to the other branches.

Figure 3:
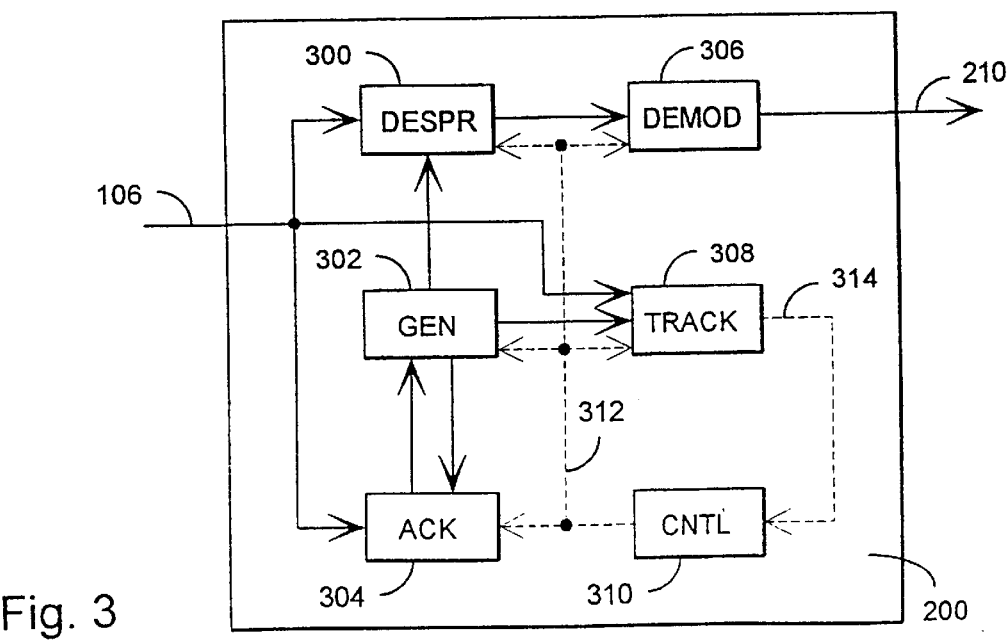
FIG. 3 is a block diagram illustrating an example of the structure of a branch in a rake receiver according to the invention.

FIG. 3 illustrates in greater detail the essential parts of a rake branch in a receiver according to the invention. It is clear for a person skilled in the art that the branch also comprises other blocks, such as the estimation of the complex coefficient of the multipath-propagated signal, but they are not shown in the figure since they are not essential to the present invention.

A rake branch in a receiver according to the invention comprises firstly a code generator 302 that generates a desired spreading code having a desired phase. The spreading code is applied to correlation means 300 that can be implemented according to known technology for example by means of a correlator or a matched filter. In the correlation means, the received signal 106 is multiplied with a spreading code that is obtained from the code generator 302 and that restores the desired signal to the original narrow band if the code has the correct phase. The obtained signal is then applied further to a demodulator 306 where the signal can be demodulated according to known technology. The demodulated signal 210 is further applied to other parts of the receiver.

The rake branch further comprises code-monitoring means 308 the input of which consists of the received signal 106 and the output signal of the code generator 302. The code-monitoring means 308 monitor changes in the phase of the signal component to be received and control the phase of the code generator so that it has the same phase as the desired signal component. The branch further comprises a control processor 310 that controls the operation of the branch. The control processor also receives information 314 from the code-monitoring means if the synchronization with the desired signal component is lost. Acquisition for a new signal component should then be started. The control processor 310 also checks from the registers of the control unit 116 in the receiver whether the signal component found is already received by some other branch. The control processor also manages the checkings and updatings of the time window register. At the beginning of a connection, the control processor 310 of each branch also phases the branch by means of the control unit 116 so that the phases of the different branches 200 to 204 of the receiver are different. It is therefore possible to speed up the finding of a new signal component.

The branch further comprises means 304 for searching for new signal components from the received signal 106. The acquisition is started by a command 312 from the control processor 310 when the phase of the previously monitored component is lost or if the level of the monitored component drops below a given threshold value. In the receiver according to the invention, the acquisition means 304 may also search for new signal components during the reception as a kind of background process. The advantage is that when the previously monitored component is lost, it is possible to immediately synchronize with a new component the phase of which has been detected as a result of the background acquisition. Both the code-monitoring means 308 and the acquisition means 306 can be implemented for example by means of correlators or matched filters.

If the receiver according to the invention is used in a base station and it is implemented in such a way that separate rake branch cards are used, the time window registers can be placed in one of the rake branches instead of the control unit 116. Further, the functions of the receiver according to the invention can be implemented in full by means of hardware for example with ASICs to obtain a compact implementation, or also by means of hardware and software.

Even though the invention is described above with reference to the example according to the accompanying drawings, it is clear that the invention is not restricted thereto, but it can be modified in many ways within the scope of the inventive idea disclosed in the appended claims.

What is claimed is:

1. A method for controlling a receiver realized with the rake principle and comprising a number of correlation branches that can be synchronized with a received signal, the method comprising:

each correlator branch in the receiver independently searches for advantageous signal components, synchronizes itself with a signal component it has found, and each branch monitors and receives the signal component it has found.

2. A method according to claim 1, wherein after it has found an advantageous signal component, each branch checks whether another branch receives the same signal component.

3. A method according to claim 2, wherein at the beginning of the reception, the correlator branches of the receiver start searching for advantageous signal delays.

4. A method according to claim 1, wherein in the acquisition of the signal component, the quality of each component found is compared to a given threshold value.

5. A method according to claim 2, that wherein the correlator branch starts receiving the signal component it has found, if the quality of the component exceeds the given threshold value and if no other correlator branch receives said component.

6. A method according to claim 4, wherein after having lost the signal component the correlator branches were monitoring, the correlator branches search for a new signal component exceeding the threshold of the given delay range.

7. A method according to claim 4, wherein the correlator branch starts receiving the signal component it has found, if the quality of the component exceeds the given threshold value and if no other correlator branch receives said component.

8. A method according to claim 1, wherein the correlator branches are phased in such a way that each branch searches for signals having different phases.

9. A method according to claim 1, wherein when the correlator branches monitor and receive an advantageous signal component, the correlator branches simultaneously search for new signal components.

10. A receiver realized with the rake principle and comprising a number of correlator branches, wherein each correlator branch having a control processor therein for providing independent decision making, the control processor of the correlator branch independently makes a decision to synchronize with the received signal, and wherein each of the correlator branches at the receiver comprise means for independently searching for advantageous signal components and the control processor of the correlator branch independently makes a decision to guide a branch to receive an advantageous signal component it has found.

11. A receiver according to claim 10, wherein the control processors of the correlator branches of the receiver check whether another receiver branch receives the signal component it has found.

12. A receiver according to claim 10, wherein the control processors of the correlator branches of the receiver compare the quality of the signal component to a given threshold value.

13. A receiver according to claim 10, wherein the receiver comprises means for phasing the correlators used for the acquisition so that each correlator searches for signals with different phases.

14. A receiver according to claims 10, wherein the receiver comprises means for searching for new signal components simultaneously with monitoring and receiving an advantageous signal component.

15. A receiver according to claimed 10, further comprising a control unit, wherein after finding a signal component, control processors of the correlator branches check the control unit to determine whether another branch is already receiving the component.

* * * * *